US006390367B1

(12) United States Patent
Doig

(10) Patent No.: US 6,390,367 B1
(45) Date of Patent: May 21, 2002

(54) FRAUD PREVENTION ARRANGEMENT

(75) Inventor: Alistair A. Doig, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/589,692

(22) Filed: Jun. 8, 2000

(30) Foreign Application Priority Data

Jun. 29, 1999 (GB) ............................................. 9915198
May 19, 2000 (GB) ............................................. 0012139

(51) Int. Cl.[7] .................................................. G06K 7/00
(52) U.S. Cl. ........................ 235/436; 235/379; 235/438
(58) Field of Search ................................ 275/436, 438, 275/379

(56) References Cited

U.S. PATENT DOCUMENTS 5,992,740 A * 11/1999 Zocca ........................ 235/436

FOREIGN PATENT DOCUMENTS

JP 59-699578 * 6/1984

* cited by examiner

*Primary Examiner*—Harold I. Pitts

(57) ABSTRACT

A self-service terminal (10) is described. The terminal (10) comprises a user interface (12) and at least one proximity sensor (40) located adjacent the user interface (12), such that the sensor (40) may detect foreign objects placed in contact with or in close proximity to the user interface (12). A fraud prevention arrangement, and a method of detecting fraud at an SST are also described.

14 Claims, 3 Drawing Sheets

FRAUD PREVENTION ARRANGEMENT

BACKGROUND OF THE INVENTION

The present invention relates primarily to self-service terminals (SSTs), such as automated teller machines (ATMs), and in particular to an SST incorporating an arrangement for fraud prevention by means of detection of unauthorized interference or tampering with data capture devices.

SSTs, such as ATMs, are commonly and increasingly used to carry out many everyday transactions which do not require human supervision. As such transactions may involve transfer or dispense of valuable media, such as banknotes or payment orders, SSTs may present a target for fraud.

To make use of a conventional ATM, a user is first required to insert a magnetic strip card into a card reader slot to the ATM fascia, the card serving as an identification token. The user must then confirm their identity by, for example, entering a personal identification number (PIN) associated with the card, but known only to the user. The PIN is entered on a keypad incorporated in the ATM.

If an unauthorized individual wishes to gain access to an individual's account and thus make unauthorized withdrawals of funds, it is necessary to both obtain the data stored on the card, and gain knowledge of the appropriate PIN or other means used to confirm the user's identity. Thus, potential targets for fraud include the magnetic card reader, and the data input or capture device used for entry of a PIN or other identifier.

Methods which have been used in attempts to execute such frauds include fitting false interfaces to the fascia of an ATM in order to intercept the relevant data as it is being communicated to the ATM. For example, an additional magnetic card reader may be placed in the entry to the existing card reader, so that the information stored on a card may be read as the card is inserted into the ATM. The intercepted data may then be used to construct a fraudulent card.

To obtain knowledge of a user's PIN a false keypad overlay may be located above the actual keypad, such that when a user enters their PIN, the sequence of digits is recorded by the false keypad. Alternatively, a user may simply be observed while using the ATM and their PIN noted. This information may then be subsequently retrieved and used in conjunction with a false card to withdraw funds from a user's account, which withdrawals may continue for an extended period before coming to the user's attention.

Similar methods may be used to interpret readings of biometrics data such as palm prints or iris appearance.

SUMMARY OF THE INVENTION

It is among the objects of embodiments of the present invention to provide an SST which reduces the risks of such frauds. It is further among the objects of embodiments of the present invention to provide an SST which alerts the SST operator to unauthorized interference with an SST.

According to a first aspect of the present invention, there is provided a self-service terminal (SST) comprising a user interface; and at least one proximity sensor located adjacent the user interface, such that the sensor may detect foreign objects placed in contact with or in close proximity to the user interface.

The sensor may be incorporated in the SST during its assembly or may be retrofitted thereto.

An advantage of this aspect of the invention is that the proximity sensor provides a self-contained detection system. That is, the operation of the proximity sensor does not rely on the interruption of a signal from a co-operating device that is located outside the SST; for example, the sensor does not detect a signal from an emitter or a transponder located outside of the SST.

The invention also relates to a method of detecting foreign objects placed in contact with or in close proximity to the user interface of an SST.

In such a manner, attempts to fit false magnetic card readers or keypad overlays to an SST may be detected.

Preferably, the proximity sensor is located rearwardly of the user interface outer surface, or is suitably disguised or concealed, such that the sensor will not be visible to a user of the SST. In a preferred embodiment, the proximity sensor is contained within the SST so that no part of it can be accessed from outside the SST. This has the advantages that a fraudulent third party is not able to see or tamper with the proximity sensor.

Proximity sensors are well known, and will not be described in detail here. Examples of sensors suitable for use in the present invention are available from Pepperl and Fuchs, Postfach 31 04 40, D-6800, Mannheim 31, Germany. Conveniently, the proximity sensor is a capacitive sensor to allow detection of metallic and non-metallic objects, or alternatively may be an inductive sensor.

Preferably also, the SST further comprises at least one data capture device that is part of or incorporated into the user interface, and the sensor is located so as to detect objects in the area immediately adjacent the data capture device. Conveniently, the SST comprises a plurality of data capture devices, each with an associated respective proximity sensor. Most preferably, the proximity sensor is located to sense objects adjacent a card reader mouth. The sensor and its associated control electronics may be powered from the card reader. Alternatively, the sensor and its associated control electronics may be powered by a dedicated unit.

Preferably also, the SST further comprises means for deactivating the SST on detection of a foreign object by the proximity sensor.

Preferably also, the SST comprises means for alerting an SST operator on detection of a foreign object by the proximity sensor. The operator may then, for example, view the SST remotely via a camera and determine if any action is required.

Preferably, the means for deactivating the SST and the means for alerting the SST operator are only actuated once the sensor detects the presence of an object for a certain minimum period of time. This will serve to help prevent said means being activated by, for example, the hands and fingers of users, or bags or purses placed on the SST fascia during a transaction.

According to a further aspect of the present invention there is provided an arrangement comprising: a data capture device; means for detecting the presence of an object in proximity to the device; and means for producing an alarm signal on detection of such an object.

In a preferred embodiment, the arrangement is suitable for being entirely enclosed by an SST.

According to a yet further aspect of the invention there is provided a method of detecting fraud at an SST, the method being characterized by the steps of: using a proximity detector to detect an object in the vicinity of a data capture device, and generating an alert signal in response to detecting such an object.

BRIEF DESCRIPTION OF THE DRAWINGS

These and other aspects of the invention will be apparent from the following specific description, given by way of example, with reference to the accompanying drawings, in which.

DETAILED DESCRIPTION

Figure 1:
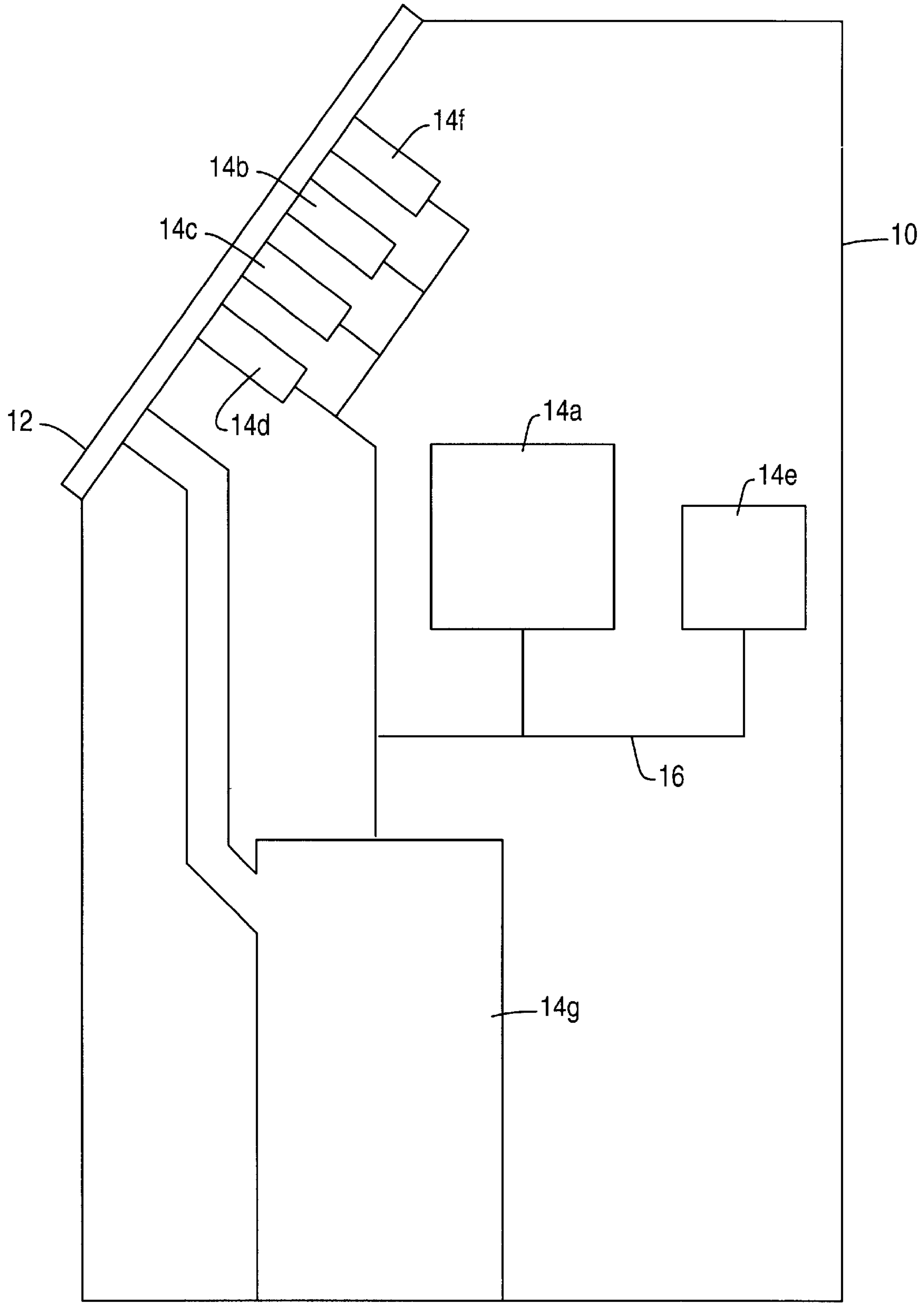
FIG. 1 is a schematic diagram of an SST in accordance with an embodiment of the invention.

Referring to FIG. 1, there is shown a schematic diagram of a public access SST 10 in the form of an ATM in accordance with an embodiment of the present invention. The ATM 10 has a user interface 12 in the form of a fascia incorporating user interface elements, and seven modules 14 interconnected by a proprietary network 16.

The modules 14 comprise a terminal controller 14*a*, a display 14*b*, an encrypting keypad 14*c*, a card reader 14*d*, a journal printer 14*e*, a receipt printer 14*f*, and a cash dispenser 14*g*. The modules 14 operate in a master/slave relationship, where the controller 14*a* is the master that controls the operation of the other modules 14*b* to 14*g*. However, each of the other modules 14*b* to 14*g* has a processor for operating on received data and for performing the specific functions of that module 14.

Journal printer 14*e* is internal to the ATM 10 and is used by the owner of the ATM 10 for reconciling transaction data, and by ATM service personnel in the event of a malfunction.

Figure 2:
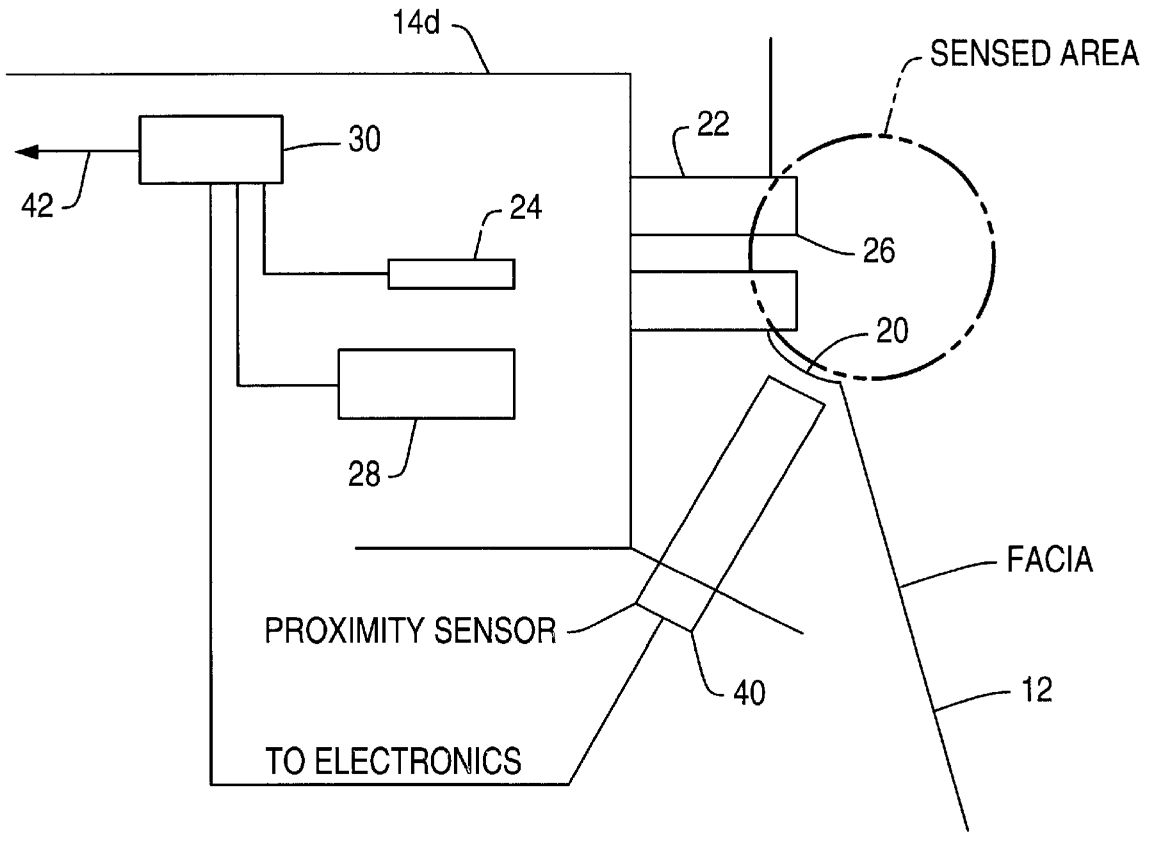
FIG. 2 is a schematic diagram of one part of the SST shown in FIG. 1.

Referring to FIG. 2, there is shown a simplified schematic diagram of the card reader module 14*d* (which is a data capture device) aligned with a card reader slot 20 in the user interface 12. Module 14*d* is a conventional card reader (such as a Sankyo motorized card reader module) having a throat 22 for guiding a card towards a card reader head 24 within the module 14*d*. Module 14*d* also has an entry/exit slot 26 at the front of the throat 22 for receiving a card into and for ejecting a card from the module 14*d*.

Slot 26 includes a pair of rollers (not shown) to guide an inserted card onto a transport mechanism 28. Transport mechanism 28 conveys a card between the entry/exit slot 26 and the magnetic card reading head 24. The card reading head 24 and the transport mechanism 28 are both controlled by a controller 30.

A capacitive proximity sensor 40, of the type available from Pepperl and Fuchs, Postfach 31 04 40, D-6800, Mannheim 31, Germany, is located adjacent the user interface 12 (the fascia) so that the sensor 40 can detect foreign objects placed in contact with or in close proximity to the card reader slot 20.

The sensor 40 is controlled by controller 30. If the sensor detects a foreign object for longer than a certain minimum period of time (for example, one minute) then controller 30 generates an alert signal. This alert signal may be relayed to the terminal controller module 14*a* via output 42. On receiving an alert signal, module 14*a* may remove the ATM 10 from service and/or may alert a remote host.

Figure 3A:
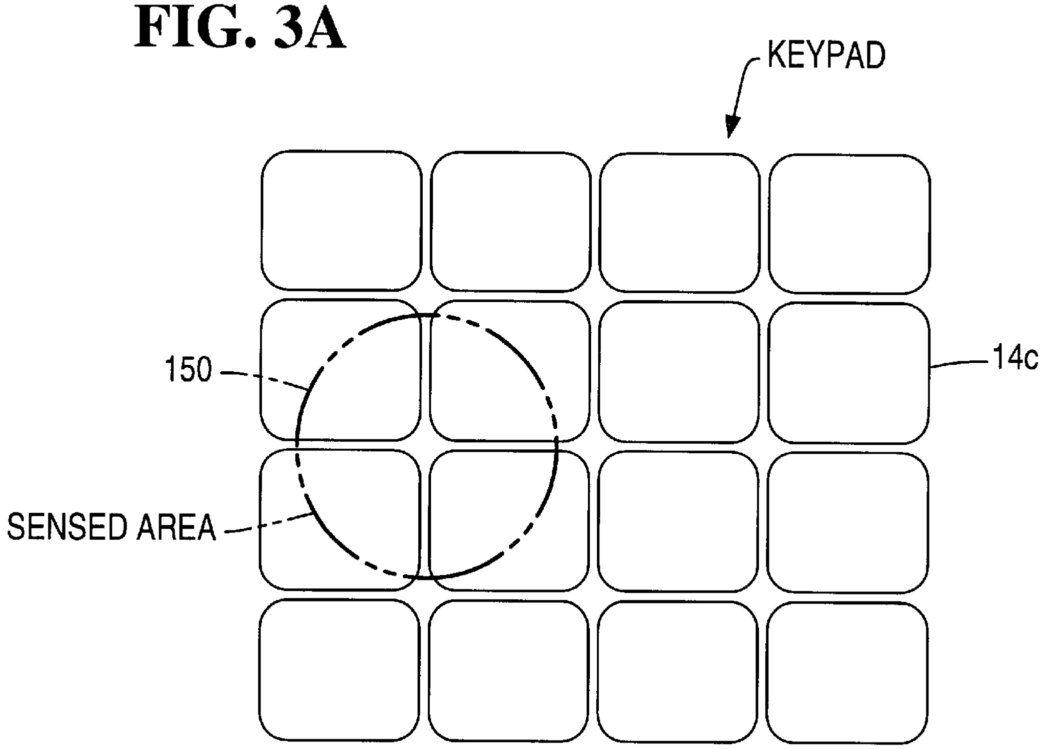
FIGS. 3A and 3B are schematic plan and side views respectively of another part of the SST shown in FIG. 1.

FIGS. 3A and B show a keypad module 14*c* (which is a data capture device) having a proximity sensor 140 (similar to sensor 40) located beneath the keypad 14*c*. In this embodiment, the sensor 140 is controlled by the terminal controller module 14*a*. Sensor 140 is used to alert the controller module 14*a* to the presence of a foreign object on the keypad 14*c*; thereby providing the controller module 14*a* with a warning to the possible presence of a fraudulent overlay keypad. The area detected by sensor 140 is illustrated by ellipse 150.

Figure 3B:
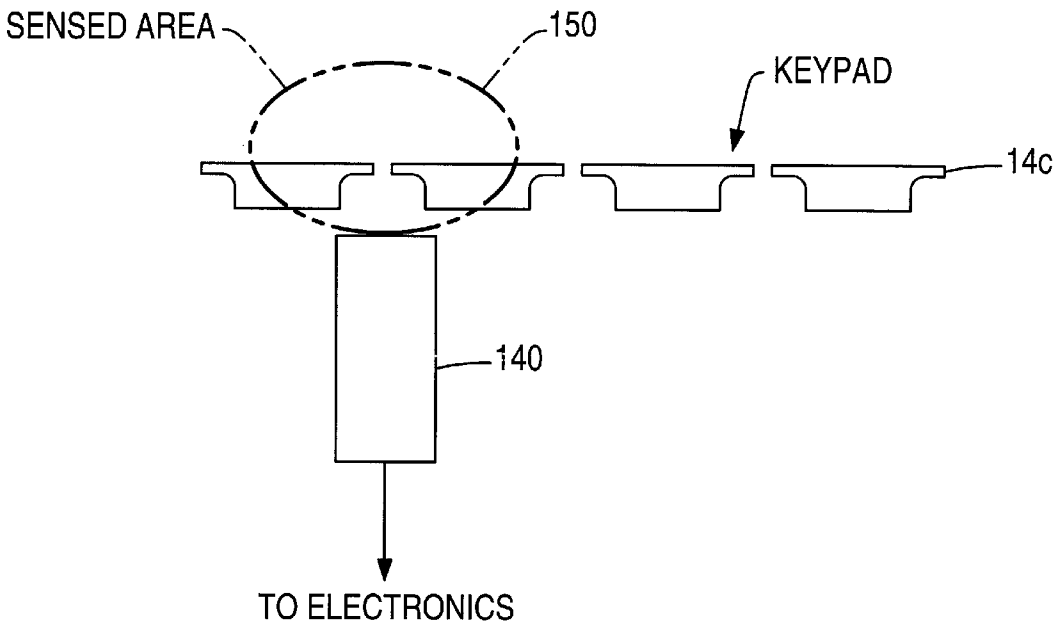

It will be appreciated that in the embodiments of FIG. 2 and FIGS. 3, the area detected by sensors 40,140 is an area liable to attack by an alien device, that is, an area over which an alien device may be placed.

Various modifications may be made to the above described embodiments, within the scope of the present invention. For example, an inductive proximity sensor may be used instead of or in addition to a capacitive proximity sensor. Other suitable types of proximity sensor may include an ultrasonic proximity detector. In other embodiments, the sensor may be used in conjunction with a camera directed towards the user interface (fascia) so that when the sensor detects a foreign object the camera captures an image of that part of the user interface in which the object was detected. The captured image may be relayed to a remote control center for review by security personnel. Using this system enables a single person located in the control center to monitor a network of ATMs.

What is claimed is:

1. A self-service terminal comprising:

a user interface; and at least one proximity sensor located adjacent the user interface and for detecting a foreign object placed in contact with or in close proximity to the user interface.

2. A self-service terminal according to claim 1, wherein the proximity sensor is located rearwardly of a user interface outer surface.

3. A self-service terminal according to claim 1, further comprising means for deactivating the self-service terminal when the proximity sensor detects a foreign object.

4. A self-service terminal according to claim 3, further comprising means for alerting a terminal operator when the proximity sensor detects a foreign object.

5. A self-service terminal according to claim 4, wherein the means for deactivating the terminal and the means for alerting the terminal operator are actuated only when the sensor detects the presence of an object for a certain minimum period of time.

6. An automated teller machine (ATM) comprising:

a currency dispenser;

a user interface for allowing an ATM customer to carry out a financial transaction to obtain currency from the currency dispenser ; and at least one proximity sensor located adjacent to the user interface and for detecting a foreign object placed in proximity to the user interface.

7. An ATM according to claim 6, wherein the proximity sensor is located rearwardly of an outer surface of the user interface.

8. An ATM according to claim 6, further comprising means for deactivating the ATM when the proximity sensor detects a foreign object in proximity to the user interface.

9. An ATM according to claim 8, further comprising means for alerting ATM personnel when the proximity sensor detects a foreign object in the proximity to the user interface.

10. An ATM according to claim 5, wherein the means for deactivating the ATM and the means for alerting ATM personnel are actuated only when the sensor detects the presence of a foreign object in proximity to the user interface for a certain minimum period of time.

11. A fraud prevention apparatus for use with a self-service terminal, the fraud prevention apparatus comprising:

a data capture device;

means for detecting the presence of an object in proximity to the data capture device; and actuatable means for producing an alarm signal when the presence of an object in proximity to the data capture device is detected.

12. A fraud prevention apparatus according to claim 11, wherein the means for producing an alarm signal is actuated only when the presence of an object is detected for a certain minimum period of time.

13. A method of detecting fraud at a self-service terminal, the method comprising:

using a proximity detector to detect an object in the vicinity of a data capture device; and generating an alert signal in response to detecting such an object.

14. A method of detecting fraud at a self-service terminal having a data capture device the method comprising:

detecting a foreign object in the vicinity of the data capture device; and generating an alert signal when a foreign object is detected in the vicinity of the data capture device.

* * * * *